INVENTORS
RICHARD W. KERN
FREDERICK P. LONGWELL
ROBERT A. WATSON

BY Paul D. Carmichael
ATTORNEY 3,232,164
OPTICAL SYSTEM FOR DETECTING AND MEASURING ANGULAR MOVEMENTS
Richard W. Kern, Vestal, Frederick P. Longwell, Binghamton, and Robert A. Watson, Endicott, N.Y., assignors to International Business Machines Corporation, New York, N.Y., a corporation of New York
Filed May 24, 1961, Ser. No. 112,289
11 Claims. (Cl. 88—14)

The present invention relates generally to the detecting and measuring arts and more particularly to the provision of a highly improved optical system for magnifying extremely small angular movements with a high degree of accuracy.

Various types of optical systems are well known in the art for detecting and indicating the relative angular or linear movement between a pair of objects. In its simplest form, such a system may comprise a magnifying lens assembly which is focused on the movable object. The deflections of the movable object are magnified in both the linear and the angular senses. The movable object itself appears larger as does the angle through which the object appears to move.

Other and more complex optical systems employ optical levers to increase the magnification in either the linear and/or angular sense. One optical lever comprises a pair of spaced planar reflecting surfaces wherein a light beam is propagated by multiple reflections along and between the planar reflecting surfaces. The angular deflection of the light beam is changed with each reflection. Relative angular movement between the planar reflecting surfaces produces multiplied angular deviation of the light beam emerging from the optical lever. A second optical lever employs a curved and generally cylindrical reflecting surface. A light beam is directed against the reflecting surface and reflected at a certain angle of incidence. By changing the angle at which the light beam is directed at the generally cylindrical reflecting surface, the angle of incidence is changed to provide a magnification of the angular movement of the light beam. This optical lever magnifies the light beam in the linear sense as well as the angular sense in that the beam width is also increased. Such optical levers are known in the art as exemplified by U.S. Patent No. 2,920,529.

The above-described optical systems are capable of magnifying angular movements of an object, such as an indicating pointer of a measuring instrument. However, as advances are made in other arts, the need exists for systems which are capable of detecting and measuring angular movements of extremely small magnitude and with a high degree of precision. For example, it may be necessary to magnify an angular movement many thousands of times in order that the same can be detected and accurately measured.

Briefly, the present invention provides an optical detecting and measuring system wherein a light beam containing optical information is passed along a pair of spaced and slightly angled planar reflecting surfaces by multiple reflections. Small relative angular movement between the planar reflecting surfaces results in a corresponding and much larger angular movement of the light beam issuing therefrom. The light beam coming from the planar reflecting surfaces is magnified or enlarged in both the linear and angular senses by a magnifying lens system and is passed via optical relay means to a generally convex reflecting surface. The light beam from the magnifying lens system moves across the generally convex reflecting surface and is again greatly magnified.

The reflected light beam from the generally convex reflecting surface is passed through suitable beam splitting means and portions thereof are directed to a pair of oppositely monitored radiation responsive devices. The radiation responsive devices are monitored to provide an error signal which is employed to control a drive means. The drive means is connected in a closed feedback loop for moving a micrometer plate disposed between the generally convex reflecting surface and the radiation responsive devices. The feedback system operates to rotate the micrometer plate to cause equal conduction of the radiation responsive devices. A very accurate and precise indication of the applied angular movement is obtained by detecting the angular movement of the light beam reflected from the generally convex cylindrical reflecting surface, the angular rotation of the micrometer plate or the error signal. It is possible to obtain an angular magnification far in excess of twenty thousand and to measure an angular movement at least as small as $1 \times 10^{-6}$ second of arc.

It is the primary or ultimate object of the invention to provide a system for detecting and measuring extremely small angular movements with a high degree of precision and accuracy. The optical system herein disclosed allows the detection and measurement of angular movements which could not heretofore be detected and/or measured with an acceptable degree of accuracy.

Another object of the invention is to provide an optical system for detecting and measuring angular movements wherein a light beam containing optical information is passed by multiple reflections between a pair of spaced planar reflecting surfaces and thence to a generally convex reflecting surface. The optical system provides an extremely high gain—in the order of at least $2 \times 10^4$—and a capability of measuring at least $1 \times 10^{-6}$ second of arc in angular movement.

Yet another object of the invention is to provide an optical system having the characteristics described in the above object wherein a collimated light beam containing optical information is introduced into and passed through a pair of spaced planar reflecting surfaces in a manner to accurately control the width of the light beam. The light beam coming from the spaced planar reflecting surfaces is magnified and passed via optical relay means to the generally convex reflecting surface.

A further object of the invention is to provide an optical system for detecting and measuring angular movements wherein the optical system is returned to its initial state by control signals generated in response to movement of the light beam reflected by the generally convex reflecting surface. Portions of the light beam reflected from the generally convex reflecting surface energize oppositely monitored radiation responsive devices to provide such control signals. The entire optical range of the system is utilized while yet providing extremely accurate measurements of the relative movement between the spaced planar reflecting surfaces.

A further object of the invention is to provide an optical system for detecting and measuring angular movements wherein no moving mechanical parts are employed in the internal magnifying stages thereof. The accuracy of the system is not affected by such mechanical considerations or variables as inertia and friction. The optical elements are adapted to be very ruggedly mounted as is required when detecting and measuring extremely small angular movements.

Still a further object of the invention is to provide an optical system for detecting and measuring angular movements which is characterized by its simplicity in construction and operation. The spaced planar reflecting surfaces are initially slightly angled with respect to each other to provide a maximum number of reflections within given lengths of the planar reflecting surfaces consistent with the range requirements of the optical system. This allows the shortest possible planar reflecting surfaces to be employed. The generally convex reflecting surface, the optical relay means and the various lens systems are easily generated. The arrangement is such that all optical components can be manufactured with a high degree of precision and at a relatively low cost.

The foregoing and other objects, features and advantages of the invention will be apparent from the following more particular description of a preferred embodiment of the invention as illustrated in the accompanying drawings.

Figure 1:
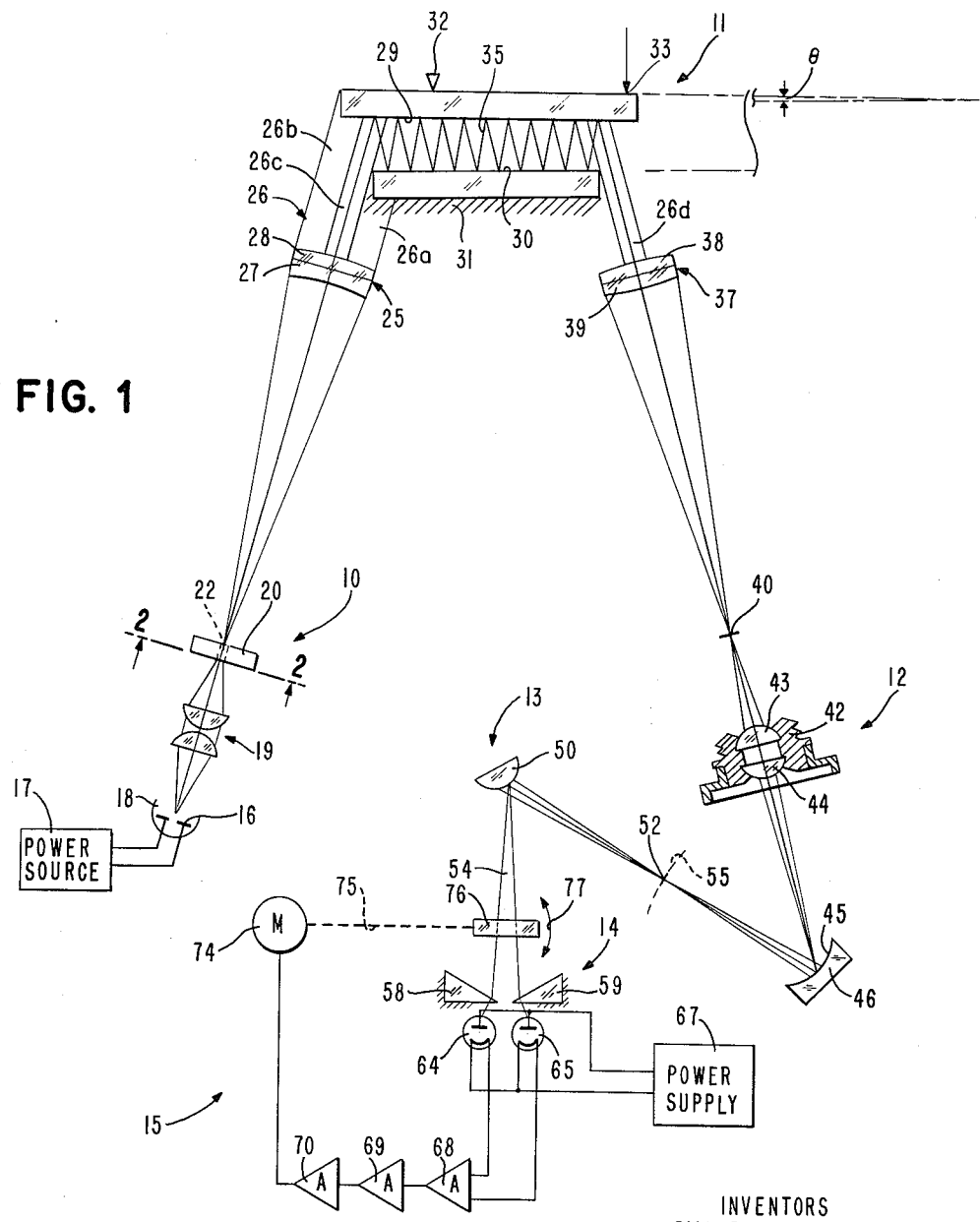
FIGURE 1 is a plan view of an optical system for detecting and measuring angular movements constructed in accordance with the teachings of the present invention.

Referring now to the drawings, there is shown an optical system for detecting and measuring extremely small angular movements with a high degre of precision and accuracy constructed in accordance with the teachings of the present invention. The optical system comprises generally a source 10 of a light beam containing optical information, a first optical magnifying means 11, a second optical magnifying means 12, a third optical magnifying means 13, a readout means 14 and a control system 15.

Figure 2:
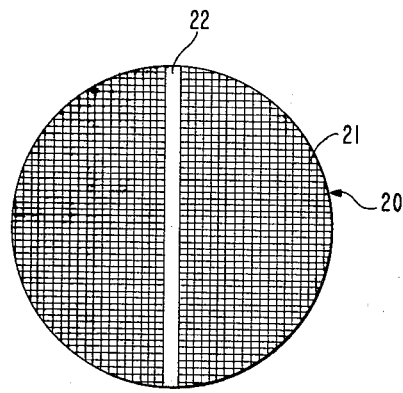
FIGURE 2 is an enlarged view of the optical object plate as seen from the section line 2—2 of FIGURE 1.

The source 10 includes any high intensity source of illumination, such as an arc lamp 16 whose electrodes are connected with a power source 17. A curved reflector 18 directs the illumination from the arc lamp 16 to a concentrating lens assembly 19. An optical object plate 20 is located forwardly of the concentrating lens assembly 19. As shown in FIGURE 2, the optical object plate 20 is an opaque circular disc 21 having a transparent vertical line 22 etched or otherwise formed thereon. The vertical line 22 is evenly illuminated by the arc lamp 16 and the focal point of the concentrating lens system 19 is generally located at the plate 20. The arrangement is such that the vertical line 22 defines an optical object for the detecting and measuring system.

The optical object plate 20 is located in a focal plane of a collimator lens system 25. The collimator lens system receives the light coming from the optical object plate 20 and provides a collimated light beam 26. The collimator lens system comprises a doublet defined by a concave lens 27 and a convex lens 28. Each portion of the collimated light beam 26 coming from the collimator lens system 25 contains information corresponding to the optical object defined by the vertical line 22. The collimated light beam 26 would theoretically form an image of this line at infinity.

The collimated beam 26 emanating from the collimator lens system 25 is passed through the first optical magnifying means 11. This optical magnifying means comprises a pair of planar reflecting surfaces 29 and 30 which are mounted in spaced but adjacent relation. The planar reflecting surface 30 is fixedly and rigidly mounted on a base 31 while the planar reflecting surface 29 is movably mounted for rotation toward and away from the planar reflecting surface 30 about a pivot axis 32. A downward moving force applied to the planar reflecting surface 29 at a point 33 will cause the right-hand end of the planar reflecting surface 29 to move toward the fixed planar reflecting surface 30. In other words, the application of moving forces to the planar reflecting surface 29 causes the same to move about the pivot axis 32 and changes the angular relation between the planar reflecting surfaces 29 and 30.

The planar reflecting surface 30 is shorter in length and positioned intermediate the ends of the planar reflecting surface 29. The relative lengths and positioning of the planar reflecting surfaces 29 and 30 provide a means for controlling or regulating the beam width of the collimated light beam which is allowed to pass through the first magnifying means 11.

Figure 3:
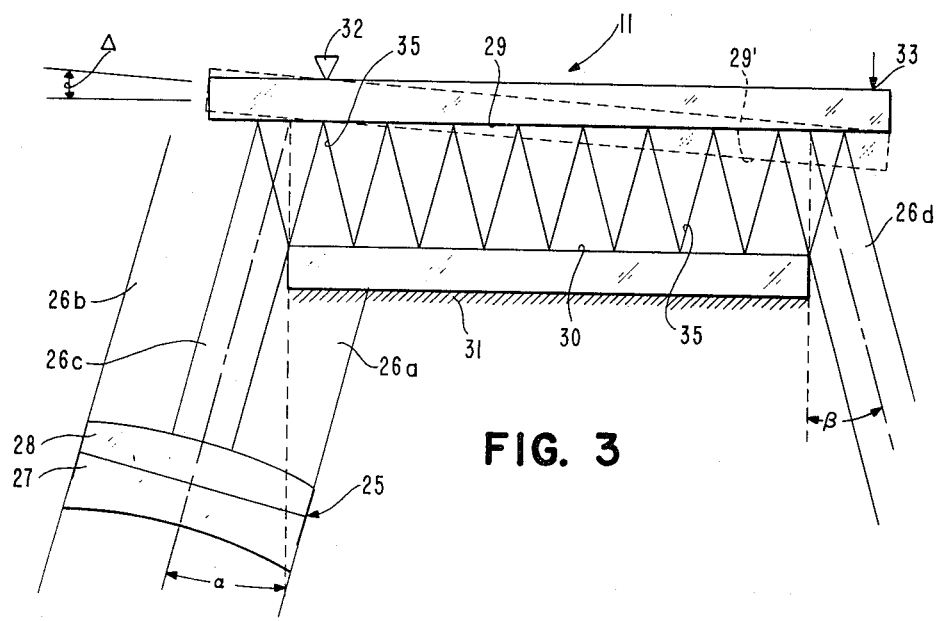
FIGURE 3 is an enlarged plan view of the first optical magnifying means showing the means employed for controlling the width of the light beam.

As more fully shown in FIGURE 3 of the drawings, the collimated light beam 26 has a beam width substantially equal to the width of the collimator lens system 25. A first portion 26a of the collimated light beam 26 strikes the left-hand edge and the bottom surface of the planar reflecting surface 30. A second portion 26b of the collimated light beam misses the planar reflecting surface 29 or is reflected at such an angle that the same passes downwardly past the left-hand end of the planar reflecting surface 30. Only a third or middle portion 26c of the collimated light beam 26 is reflected from the planar reflecting surface 29 at an angle whereby the same strikes the planar reflecting surface 30 and is again reflected.

The width of the portion 26c of the collimated light beam 26 entering the first magnifying means 11 is controlled by selection of the angle of incidence $\alpha$ at which the collimated light beam 26 is directed toward planar reflecting surface 29, the relative longitudinal spacing between the ends of the planar reflecting surfaces 29 and 30 and the distance or separation between these planar reflecting surfaces. For example, moving the planar reflecting surface 30 to the right from the position shown in FIGURE 3 will decrease the beam width. Moving the planar reflecting surfaces 29 and 30 toward each other will also decrease the beam width and increasing the angle of incidence $\alpha$ will increase the beam width. The portion 26c of the collimated light beam entering the magnifying means 11 may be quite small. This is highly advantageous in that a maximum number of reflections can be obtained for given lengths of the planar reflecting surfaces 29 and 30 without overlap of the adjacent reflections. Further, a small beam width permits the use of certain bias adjustments which increase the number of possible reflections within the first magnifying means as will be hereinafter more fully explained.

The portion 26c of the collimated light beam 26 enters the means 11, strikes the planar reflecting surface 29 and then is reflected back and forth between the planar reflecting surfaces 30 and 29 until the same finally emerges from the far or right-hand end of this first magnifying means. In other words, the portion 26c of the collimated light beam is propagated by multiple reflections 35 along the length of the planar reflecting surfaces 29 and 30. The right-hand end of planar reflecting surface 30 is spaced longitudinally with respect to the right-hand end of planar reflecting surface 29 and this spacing is selected to control the final beam width of the collimated beam 26d passing from the first magnifying means 11.

When the planar reflecting surfaces 29 and 30 are disposed in parallel relation as shown in FIGURE 3 of the drawings, the collimated beam 26d will emerge from the means 11 at an angle of reflection $\beta$ which is exactly the same as the angle of incidence $\alpha$ of the portion 26c of the collimated light beam 26 entering this first magnifying means. The number of reflections between the planar reflecting surfaces 29 and 30 will be determined by the legnth of these planar reflecting surfaces, the vertical distance between the same, the relative longitudinal positioning thereof and the angle of incidence $\alpha$ and the beam width of the portion 26c of the collimated light beam 26. A moving force applied at the point 33 moves the planar reflecting surface 29 to a position 29' and changes the angular relation between the planar reflecting surfaces 29 and 30 by an angle Δ. The change in the angle of reflection β of the collimated light beam 26d leaving the first magnifying means 11 is equal to twice the number of reflections of the collimated beam from the planar reflecting surface 29 multiplied by the angular movement between the planar reflecting surfaces or Δ. Accordingly, the angular movement of the planar reflecting surface 29 about the pivot axis 32 results in a highly magnified change in the angle of reflection β of the collimated beam 26d which is expressed by the following equation:

Change in angle of reflection β=(2)(Δ) (number of reflections from planar reflecting surface 29).

Figure 4:
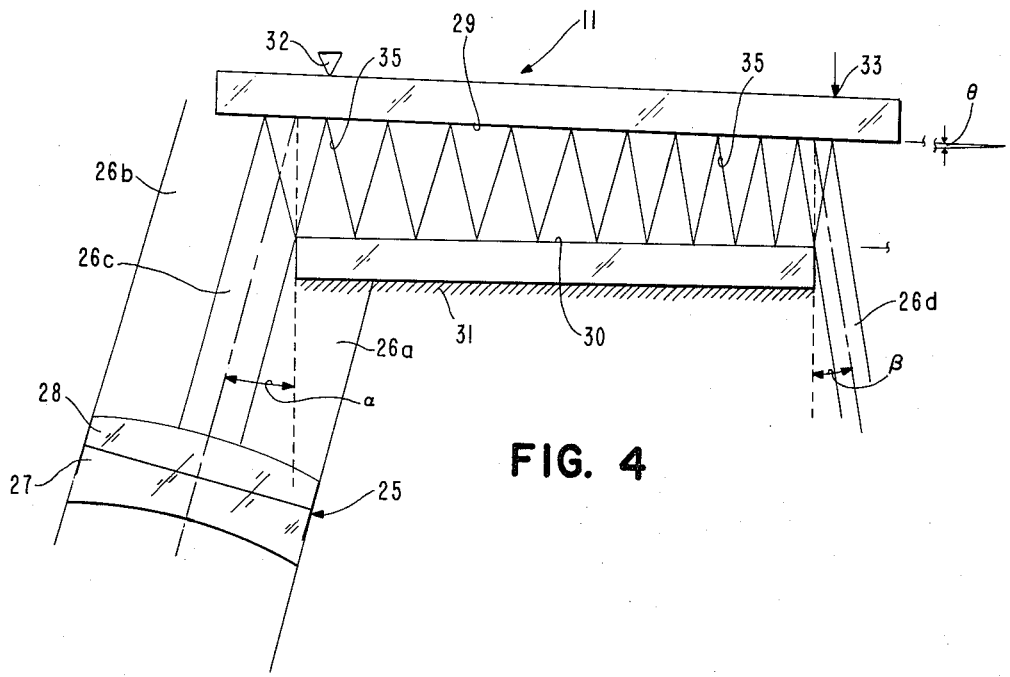
FIGURE 4 is an enlarged plan view similar to FIGURE 3 showing the initial bias adjustment between the planar reflecting surfaces.

It will be observed that the magnification of the angular movement of the planar reflecting surface 29 is directly dependent upon and a function of the number of reflections experienced by the collimated beam in passing through the first magnifying means. To increase the number of reflections for given lengths of the planar reflecting surfaces 29 and 30, these surfaces are initially positioned in slightly angled relation as shown in FIGURE 4 of the drawings. The initial bias angle between the planar reflecting surfaces 29 and 30 is quite small and is designated by the reference indicium θ. The arrangement is such that the angles of reflection of the collimated beam increase toward 90° along the lengths of the planar reflecting surfaces 29 and 30 whereby the angle of reflection β of the collimated beam 26d is smaller than the angle of incidence α. The initial angular bias θ does not affect the overall operation of the optical detecting and measuring system since the same is treated as a starting or biasing function.

The first optical magnifying means 11 is designed in connection with the source 10 of the collimated light beam 26 to provide a maximum number of reflections for given lengths of the planar reflecting surfaces 29 and 30 consistent with the angular magnification desired and the expected range of angular movement of the planar reflecting surface 29. Thus, the planar reflecting surfaces 29 and 30 are of minimum lengths for a desired number of reflections or angular magnifications which greatly facilitates accurate manufacture and mounting of these surfaces. The various figures of the drawings show approximately ten reflections from the planar reflecting surface 29. It should be clearly understood that these showings are not intended to be a limitation since the number of reflections from the planar reflecting surface 29 will depend upon the angular magnification desired in the first optical magnifying means.

The collimated beam 26d emerging from the first magnifying means 11 enters a telescope lens system 37 comprising a doublet of the lenses 38 and 39 and having a focal plane at the point 40. The vertical line 22 projected from the optical object plate 20 is focused in the focal plane 40. The vertical line 22 at the focal plane 40 will move angularly in accordance with any angular motion imparted to the planar reflecting surface 29 of the means 11 and such movement will be magnified in accordance with the number of reflections through the means 11.

The collimating means comprising the collimator lens system 25 and the telescope lens system 37 is employed to insure that the image of the vertical line 22 remains in the plane defined by the focal plane 40. For example, if the parallel light beam between the planar reflecting surfaces was replaced with a non-parallel high beam, the position of the focal plane corresponding to the focal plane 40 would move in accordance with movements of the planar reflecting surface 29 about the pivot axis 32 since the length of the optical path defined by the multiple reflections between the planar reflecting surfaces 29 and 30 is changed.

A short focal length lens system 42 comprising a pair of plano-convex lens 43 and 44 defines the second optical magnifying means 12. The lens system 42 is focused on the focal plane 40 and projects the image of the vertical line 22 onto a generally cylindrical and concave reflecting surface 45 of a relay reflector 46. The lens system 42 provides magnification in both the linear and angular senses in that the vertical line 22 itself appears larger and the apparent deflection thereof in response to angular movements of the planar reflecting surface 29 is increased. The first magnifying means 11 provides only angular magnification in that the vertical line which would appear in the focal plane 40 is the same size as the vertical line 22 projected from the optical object plate 20 provided, of course, that the collimator lens system 25 and the telescope lens system 37 have the same focal lengths.

Figure 5:
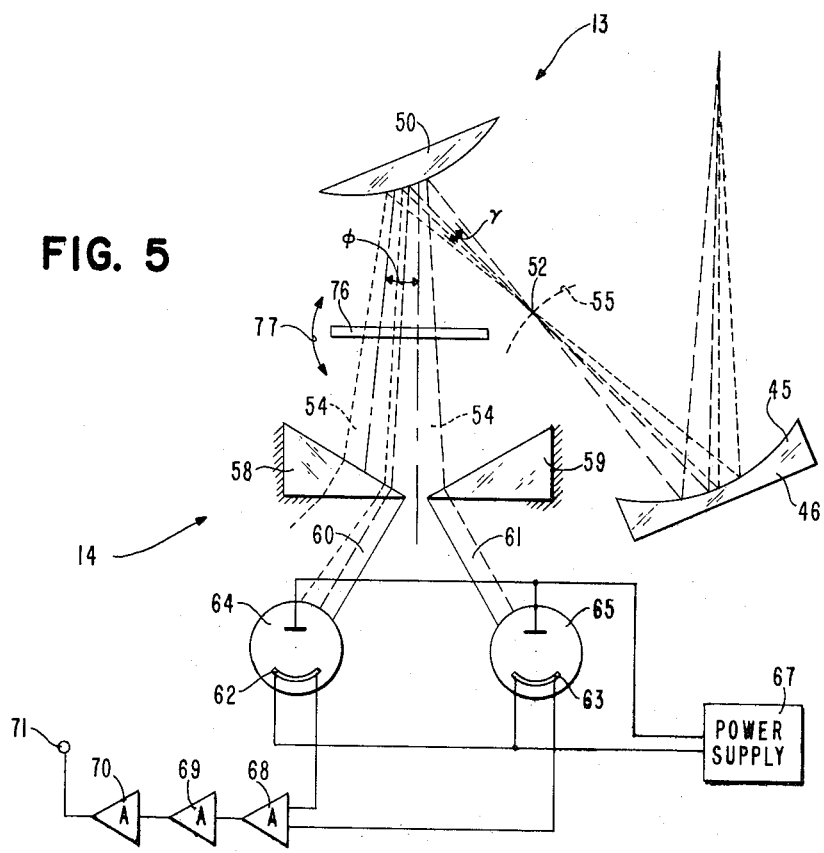
FIGURE 5 is an enlarged plan view of the optical relay means, a third optical magnifying means and the readout means employed in the optical system of FIGURE 1.

The optical image projected on the concave reflecting surface 45 of the relay reflector 46 is transmitted to a curved and generally cylindrical convex reflecting surface 50 defining the third optical magnifying means 13. As shown in FIGURE 5 of the drawings, point 52 is defined where the reflected light rays from the relay reflector 46 cross dependent upon the angle of incidence and reflection. The point 52 is disposed generally midway between the concave reflecting surface 45 of the relay reflector 46 and the convex reflecting surface 50. The concave reflecting surface 45 performs primarily a relay function in transmitting the image of the optical object from the second magnifying means 12 defined by the short focal length lens system 42 to the third magnifying means comprising the convex reflecting surface 50. Any comparable optical relaying means may be employed in place of the concave reflecting surface 45.

Relative angular movement between the planar reflecting surfaces 29 and 30 in response to a moving force applied at the point 33 will cause movement of the magnified image of the optical object across the convex reflecting surface 50. A small change in the angle at which the image is directed toward the convex reflecting surface 50 will result in a greatly increased change in the angle at which the image is reflected from this reflecting surface. For example, an angular deflection of the image coming from the relay reflector 46 through an angle γ will result in a much larger angular deflection φ of the reflected beam 54 coming from the convex reflecting surface 50 in a single plane or dimension. This is clearly shown in FIGURE 5 of the drawings. The means 13 defined by the convex reflecting surface 50 magnifies the projected and magnified image of the vertical slit 22 in both the angular and linear senses. Not only is the angular movement of the beam directed toward the convex reflecting surface 50 highly magnified, but also the size of the projected image of the optical object defined by the vertical line 22 is increased.

The angular and linear magnification performed by the convex reflecting surface 50 is not linear in that equal angular deflections of the light beam over different portions of the convex reflecting surface 50 do not produce equal magnifications. An angular deflection of the light beam adjacent one side edge of the convex reflecting surface 50 will produce a greater angular and linear magnification than the magnification produced by the same deflection about the center of the reflecting surface. The amount of linear and angular magnification or the gain provided by the means 13 is a function of the angle of incidence of the light beam relayed to the convex reflecting surface 50, the area at which this light beam strikes this reflecting surface and the radius of curvature or shape thereof. While the magnification provided by the convex reflecting surface 50 is not linear, the deflections of the beam 54 are directly related to the angular movements between the planar reflecting surfaces 29 and 30 and this relationship can be obtained either experimentally or mathematically. It should be apparent that angular deflection of the beam 54 is a highly amplified or magnified measure of the relative angular movement between the planar reflecting surfaces 29 and 30.

As previously mentioned, the crossover point 52 is disposed generally midway between the concave reflecting surface 45 and the convex reflecting surface 50. The point 52 will move along a line 55 in response to deflections of the light beam reflected from the relay reflector 46 due to the shape or curvature of the concave reflecting surface 45. The distance between the point 52 and the convex reflecting surface 50 changes in response to deflections of the light beam. This is not objectionable due to the particular readout means employed as will be hereinafter more fully explained. However, the curvatures of the concave reflecting surface 45 and/or the convex reflecting surface 50 can be generated to exactly compensate for any translation of the point 52 when the light beam is deflected due to relative angular movement between the planar reflecting surfaces 29 and 30.

The convex reflecting surface 50 is generally cylindrical and has a fixed radius of curvature in the disclosed embodiment of the invention. The invention, in its broader aspects, envisions the use of other convex reflecting surfaces, such as spherical or alternately aspherical to obtain varying angular sensitivities. Any figure of revolution (parabolic, hyperbolic or a combination thereof, for example) may be employed in generating the convex reflecting surface 50. The particular shape or curvature of the convex reflecting surface 50 will depend upon the application and use of the overall optical system.

The reflected beam 54 from the convex reflecting surface 50 passes to the readout means 14 comprising a beam splitter defined by a pair of prisms 58 and 59. The prisms 58 and 59 are mounted in longitudinally spaced and inwardly facing relation whereby the same intercept the outer edges of the light beam 54 when the optical system is in its initial state. Prior to relative angular movement between the planar reflecting surfaces 29 and 30, the prisms 58 and 59 divert outwardly equal portions 60 and 61 of the light beam 54 coming from the convex reflecting surface 50.

The light beams 60 and 61 illuminate with equal intensity the photoemissive surfaces 62 and 63 of a pair of photomultiplier electron discharge devices 64 and 65. Photomultiplier discharge devices are well known in the art and each comprise an anode, a plurality of dynodes and a photoemissive cathode. The conduction of a photomultiplier discharge device is a function of the intensity of illumination of the photoemissive cathode or the total number of light photons striking the photoemissive cathode. The discharge devices 64 and 65 are connected to a suitable power supply 67.

The photomultiplier discharge devices 64 and 65 provide input signals to a difference amplifier 68. When the outputs of the photomultiplier discharge devices are equal, the difference amplifier 68 does not provide an output signal. However, when one of the photomultiplier discharge devices is rendered more conductive than the other, the output or error signal supplied by the difference amplifier 68 is proportional to the difference in conduction of these elements. The sign or polarity of the error signal from the difference amplifier 68 identifies which of the photomultiplier discharge devices has been rendered more conductive.

The output or error signal from the difference amplifier 68 changes as a function of the relative angular movement between the planar reflecting surfaces 29 and 30. A small movement of the planar reflecting surface 29 about the pivot axis 32 will cause a highly magnified angular deflection of the light beam 54. This results in an increase in the number of photons emitted by one of the photoemissive cathodes 62 or 63 and a corresponding decrease in the number of photons emitted by the other cathode due to the change in beam widths of the portions 60 and 61 of the light beam. The error signal from the difference amplifier 68 is a measure of the relative angular movement between the planar reflecting surfaces 29 and 30.

A photomultiplier discharge device is extremely sensitive in that a small change in the intensity of illumination of the photoemissive cathode thereof results in a magnified and detectable change in the conduction thereof. Filters or other optical means may be employed in connection with the photomultiplier discharge devices.

The output or error signal from the difference amplifier 68 is passed through electronic amplifier stages 69 and 70 to provide amplification of the electrical signals as may be required. An electrical signal taken from output terminal 71 (see FIGURE 5) is related to the small angular movements between the planar reflecting surfaces 29 and 30. The readout means 14 defined by the prisms 58 and 59, the photomultiplier discharge devices 64 and 65, the difference amplifier 68 and the amplifier stages 69 and 70 provide an accurate optical-to-electrical transducing system.

The output of the amplifier stage 70 may be employed to drive a reversible servo motor 74, as shown in FIGURE 1 of the drawings. The servo motor 74 is interconnected with a micrometer plate 76 by any suitable drive connection 75. The micrometer plate 76 intercepts the light beam 54 and is disposed between the convex reflecting surface 50 and the beam splitter defined by the prisms 58 and 59. The servo motor 74 is operative to rotate the micrometer plate 76 about a line normal to the light beam 54 as represented by the arrow 77. The light beam 54 is displaced when the micrometer plate 76 is rotated in a manner determined by the index of refraction of the material forming the same and the thickness thereof.

When the photomultiplier discharge devices provide equal output signals, no error signal is provided by the difference amplifier 68. The servo motor 74 is de-energized and the micrometer plate 76 remains in its present rotational position. A moving force applied at the point 33 on the planar reflecting surface 29 causes one of the photomultiplier discharge devices to conduct to a larger extent than the other photomultiplier discharge device. A control signal is supplied to the servo motor 74 whereby the micrometer plate 76 is rotated in a direction that causes a displacement of the light beam 54 until the photomultiplier discharge devices again provide equal output signals. The direction of rotation of the micrometer plate 76 depends upon which of the photomultiplier discharge devices is more conductive.

The control system 15 is, in essence, a closed loop feedback system wherein the light beam 54 is displaced by the micrometer plate 76 to maintain the photomultiplier discharge devices equally conductive. A highly magnified mechanical indication of the relative angular movement between the planar reflecting surfaces 29 and 30 is provided by observing the rotation or angular movement of the micrometer plate 76.

The operation of the disclosed optical system for detecting and measuring angular movements should now be apparent. An extremely small angular movement between the planar reflecting surfaces 29 and 30 results in a highly magnified angular deflection of the collimated light beam 26d. This magnified angular deflection is further acted on by the magnifying lens system 42 defining the second optical magnifying means 12. A relay reflector 46 sweeps the beam of light from the magnifying lens system 42 across the convex reflecting surface 50 providing the third optical magnifying means 13. An optical-to-electrical readout means 14 in combination with the control system 15 provides an accurate means for detecting and/or measuring the deflection of the light beam 54. The magnifying lens system 42 and the convex reflecting surface 50 magnify the optical object defined by the vertical line 22 in both the linear and angular senses whereby the light beam 54 coming from the convex reflecting surface 50 has an appreciable beam width as is required for use in connection with the beam splitter of the readout means 14. However, the light beam 26c reflected along and between the planar reflecting surfaces 29 and 30 is of a minimum beam width whereby a maximum number of reflections can be obtained for given lengths of these planar reflecting surfaces consistent with the range requirements of the optical system.

In the disclosed embodiment of the invention, the planar reflecting surface 29 is moved about the pivot axis 32. This arrangement is particularly advantageous when it is desired to detect or measure a linear movement at the point 33 (such as the expansion or contraction of a physical body under certain conditions, for example). This linear movement is easily related to the angular movement between the planar reflecting surfaces 29 and 30. It is also possible to support the planar reflecting surface 29 as a pendulum whereby the pivot axis 32 would be disposed midway between the ends thereof. The overall length of the optical path taken by the collimated light beam reflected along and through the planar reflecting surfaces would not change due to relative angular movements between these planar reflecting surfaces. This latter arrangement is especially well adapted for use where angular movements are being detected or measured directly.

It should now be apparent that the objects initially set forth have been accomplished. Of particular importance is in provision of a highly improved optical system for detecting and measuring extremely small angular movements which could not heretofore be readily detected or measured with a high degree of accuracy.

While the invention has been particularly shown and described with reference to preferred embodiment thereof, it will be understood by those skilled in the art that the foregoing and other changes in form and details may be made therein without departing from the spirit and scope of the invention.

What is claimed is:

1. A system for detecting and measuring small movements comprising a source of a light beam, a pair of spaced planar reflecting surfaces, means to effect relative angular movement between said planar reflecting surfaces corresponding to said small movements, said light beam being directed at an angle toward said planar reflecting surfaces, said light beam being reflected between and along said planar reflecting surfaces by multiple reflections to provide a magnified angular deflection of said light beam proportional to the relative angular movement between said planar reflecting surfaces, a substantially convex reflecting surface, optical means relaying the light beam coming from said planar reflecting surfaces to said convex reflecting surface, said convex reflecting surface providing a reflected light beam, said reflected light beam being deflected through a magnified angular movement in response to the relative angular movement between said planar reflecting surfaces, a pair of radiation responsive devices, each of said radiation responsive devices receiving at least a portion of said reflected light beam, and means to compare the outputs of said radiation responsive devices to provide a greatly magnified indication of the relative angular movement between said planar reflecting surfaces.

2. Apparatus according to claim 1 further comprising a micrometer plate disposed between said convex reflecting surface and said radiation responsive devices, drive means connected to said micrometer plate for moving the same, and said means to compare controlling said drive means.

3. Apparatus according to claim 1 further characterized in that said optical means comprises a substantially concave reflecting surface, and said concave reflecting surface being disposed between said convex reflecting surface and said planar reflecting surfaces.

4. A system for detecting and measuring small movements comprising a source of a light beam, a pair of spaced reflecting surfaces, said light beam being directed at an angle toward said spaced reflecting surfaces, said light beam being reflected along and between said spaced reflecting surfaces, means for coupling said small movements to the reflecting surfaces to effect corresponding relative movement between said spaced reflecting surfaces, a substantially convex reflecting surface, optical means relaying the light beam coming from said spaced reflecting surfaces to said convex reflecting surface, said convex reflecting surface providing a reflected light beam, said reflected light beam being deflected through a magnified angular movement in response to movement between said spaced reflecting surfaces, and means to detect the angular movement of said reflected light beam.

5. Apparatus according to claim 4 further characterized in that said source comprises a light radiating means, an optical object assembly and a collimator lens system whereby said light beam is collimated, and a telescope lens system disposed between said spaced reflecting surfaces and said optical means for receiving said light beam coming from said spaced reflecting surfaces.

6. Apparatus according to claim 4 further comprising a magnifying lens system disposed between said spaced reflecting surfaces and said convex reflecting surface, and said magnifying lens system receiving said light beam coming from said spaced reflecting surfaces to magnify the same in the linear and angular senses.

7. Apparatus according to claim 4 further characterized in that said optical means comprises a substantially concave reflecting surface for receiving said beam of light coming from said spaced reflecting surfaces.

8. A system for detecting and measuring small movements comprising a source of a light beam, a pair of spaced planar reflecting surfaces, said light beam being reflected along and between said planar reflecting surfaces, means for coupling the small movements to said reflecting surfaces to effect corresponding relative movement between said planar reflecting surfaces, a substantially convex reflecting surface receiving the light beam coming from said planar reflecting surfaces, said convex reflecting surface providing a reflected light beam, said reflected light beam being deflected through a magnified angular movement in response to relative angular movement between said planar reflecting surfaces, and means to detect the angular movement of said reflected light beam.

9. Apparatus according to claim 8 further comprising means for controlling the width of the light beam reflected between said planar reflecting surfaces, said planar reflecting surfaces being of different lengths, said planar reflecting surfaces being positioned in longitudinally spaced relation, and the longitudinal spacing of said planar reflecting surfaces comprising said means for controlling.

10. Apparatus according to claim 8 wherein said planar reflecting surfaces are initially angled with respect to each other, said light beam being directed toward one of said planar reflecting surfaces at a certain angle of incidence, and the angles of reflection of said light beam increasing toward ninety degrees as said light beam is passed between and along said planar reflecting surfaces by multiple reflections to provide a maximum number of said reflections for given lengths of said planar reflecting surfaces.

11. An apparatus for determining small physical movements, comprising:
    a first reflective member mounted for pivotal movement about a point adjacent an extremity and in a direction substantially normal to the reflective surface, said small movements being directly applied to said reflective member at a point remote from said pivotal point;
    a second reflective member fixedly mounted adjacent said first reflective member with the reflective portions of each member in a generally opposed relation;

a light beam directed onto the reflective portion of said first reflective member in the region adjacent the pivotal point and at such an angle that multiple reflections of said beam occur between the reflective portions to provide a reflected and angularly magnified beam at a point remote from said pivotal point;

a third reflective member having a convex reflective portion, said convex reflective portion being in the optical path of the beam after said beam emerges from the portions of said first and second members to provide a finally reflected and further angularly magnified beam; and means intercepting said finally reflected beam for indicating the position of said beam and relating changes in position of said finally reflected beam from a reference position to the movements of said first reflective surface.

References Cited by the Examiner

UNITED STATES PATENTS

| | | | |
|---|---|---|---|
| 2,920,529 | 1/1960 | Blythe | 88—73 |
| 3,088,297 | 5/1963 | Kapany et al. | 88—14 |
| 3,137,756 | 6/1964 | Gunther et al. | 88—14 |

FOREIGN PATENTS 1,216,986  12/1959  France.

JEWELL H. PEDERSEN, *Primary Examiner.*

EMIL G. ANDERSON, *Examiner.*